(12) United States Patent
Von Koenigsegg et al.

(10) Patent No.: US 12,049,927 B2
(45) Date of Patent: Jul. 30, 2024

(54) AXIALLY STABILIZED GEAR ASSEMBLY

(71) Applicant: KOENIGSEGG AUTOMOTIVE AB, Ängelholm (SE)

(72) Inventors: Christian Von Koenigsegg, Vejbystrand (SE); Dag Bölenius, Ängelholm (SE); Emil Langeland Larsen, Ängelholm (SE); Ruben Lend, Vejbystrand (SE)

(73) Assignee: KOENIGSEGG AUTOMOTIVE AB, Ängelholm (SE)

( * ) Notice: Subject to any disclaimer, the term of this patent is extended or adjusted under 35 U.S.C. 154(b) by 0 days.

(21) Appl. No.: 18/270,586

(22) PCT Filed: Jan. 6, 2022

(86) PCT No.: PCT/EP2022/050220
§ 371 (c)(1),
(2) Date: Jun. 30, 2023

(87) PCT Pub. No.: WO2022/148823
PCT Pub. Date: Jul. 14, 2022

(65) Prior Publication Data
US 2024/0077117 A1    Mar. 7, 2024

(30) Foreign Application Priority Data
Jan. 7, 2021 (EP) .................................. 21150534

(51) Int. Cl.
*F16D 13/70* (2006.01)
*F16D 25/0638* (2006.01)

(52) U.S. Cl.
CPC .......... *F16D 13/70* (2013.01); *F16D 25/0638* (2013.01)

(58) Field of Classification Search
CPC ..... F16D 13/70; F16D 13/648; F16D 25/0638
See application file for complete search history.

(56) References Cited

U.S. PATENT DOCUMENTS 4,271,951 A * 6/1981 Nishimura .......... F16D 25/0638
                                                        192/85.28
6,840,363 B2 * 1/2005 Braford, Jr. ............. F16D 13/72
                                                        192/85.25
(Continued)

FOREIGN PATENT DOCUMENTS

CN    104196914 A    12/2014
GB       920701 A1    3/1963
WO  WO2020/161334 A1    8/2020

OTHER PUBLICATIONS

International Search Report and Written Opinion dated Mar. 14, 2022 issued in corresponding PCT Application No. PCT/EP2022/050220.

*Primary Examiner* — Jacob S. Scott
*Assistant Examiner* — Farhana Pervin
(74) *Attorney, Agent, or Firm* — Shore IP Group, PLLC; Howard J. Klein

(57) ABSTRACT

A gear assembly (8) for mounting on a shaft (12) is described. The gear assembly (8) comprises: a gear wheel (80) configured to be rotationally supported with respect to the shaft (12) and a multiple-plate wet clutch (10). The wet clutch (10) comprises: a front part (34), a back part (42), a clutch basket attached to the gear wheel (80), and a clutch pack (20) connecting the clutch hub (16) and the clutch basket (18) and positioned between the front part (34) and the back part (42). The clutch pack (20) has: an unengaged state in which the clutch hub (16) and the clutch basket (18) are unlocked, and an engaged state in which the clutch hub (16) and the clutch basket (18) are locked together, wherein the back part (42) is spaced apart from the gear wheel (80) in the unengaged state, and the back part (42) engages the gear wheel (80) in the engaged state.

11 Claims, 8 Drawing Sheets

(56) References Cited

U.S. PATENT DOCUMENTS

2018/0216672 A1\* 8/2018 Putzer ................... F16D 28/00
2019/0085908 A1\* 3/2019 Janasek ............... F16D 25/0638

\* cited by examiner

AXIALLY STABILIZED GEAR ASSEMBLY

CROSS-REFERENCE TO RELATED APPLICATIONS

This application is a national phase entry, under 35 U.S.C. 371, of International Application No. PCT/EP2022/050220, filed Jan. 6, 2022, the disclosure of which is incorporated herein by reference in its entirety. International Application No. PCT/EP2022/050220 claims priority from European Application No. 21150534.2, filed Jan. 7, 2021.

TECHNICAL FIELD

The proposed technology generally relates to the field of wet clutches for road vehicles, and in particular to gear assemblies including a wet clutch and a gear wheel that are subjected to axial loads in high performance applications.

BACKGROUND

In some applications, the dimensions of a single plate clutch are too great and there is a need for a more compact clutch for transferring the required torque. This can be obtained by multiple-plate clutches, which allows for smaller diameters with a maintained total friction force. Multiple-plate clutches is a well-established technology. In road vehicles, they are typically found in motorcycles and high-performance cars. Multiple-plate clutches have several driving members interleaved with several driven members, typically collected in a clutch pack. There is a need to further reduce the dimensions of clutches, or at least to maintain current dimensions, with improved efficiency.

The friction elements, or driving and driven members, of a dry clutch are not subjected to a cooling lubricating liquid and rely on mechanical friction to engage. In a wet clutch, the friction elements are typically immersed in a cooling and lubricating liquid allowing for a smoother performance and longer life.

In some applications, the viscous drag in the clutch pack of a wet clutch that is unengaged for a prolonged period may result in efficiency losses. Such wet clutches are typically designed such that they are disengaged when not activated and engaged when actively activated. Thus, there is a need for a multiple-plate wet clutch that reduces the viscous drag when the clutch is disengaged.

The clutch basket of a multi-plate wet clutch can be attached to a gear wheel centered on the same shaft. The gear wheel, and in extension the clutch basket, are rotationally supported relative to the shaft, for example by rolling-element bearings. When the wet clutch is engaged and torque is transferred to the gear wheel, the gear wheel may be subjected to, or generate, an axial load in the direction of the wet clutch, which can put a strain on the bearings and cause an axial shift of the gear wheel.

SUMMARY

It is an object of the proposed technology to improve the efficiency and reduce the overall dimensions of multiple-plate wet clutches. It is a further object to improve the axial stability of gear assembly that includes a wet clutch and a gear wheel.

In a first aspect of the proposed technology, a gear assembly for mounting on a shaft is provided. The gear assembly comprises: a gear wheel, or cog wheel, configured to be rotationally supported with respect to the shaft and a multiple-plate wet clutch. The wet clutch comprises: a clutch hub configured to be mounted on the shaft, a front part, or collar, configured to be fixed relative to, or mounted on, the shaft, a back part, or radially extending flange, configured to be fixed relative to, or mounted on, the shaft, a clutch basket attached to, or mounted on, the gear wheel and a clutch pack operationally connecting the clutch hub and the clutch basket, wherein the clutch pack is positioned between the front part and the back part. The wet clutch further comprises: an actuator supported by the front part and configured to engage the clutch pack and press the clutch pack against the back part. The clutch pack has: an unengaged state in which the clutch hub and the clutch basket are unlocked, and an engaged state in which the clutch hub and the clutch basket are locked together. Additionally, the back part is spaced apart from the gear wheel in the unengaged state, and the back part engages, or contacts, the gear wheel in the engaged state, or the gear assembly is configured such that the back part engages, or contacts, the gear wheel in the engaged state.

In a second aspect of the proposed technology, a shaft assembly is provided that comprises: a shaft, and a gear assembly according to the first aspect of the proposed technology that is mounted on the shaft.

The gear assembly and the shaft assembly may be for used in a gearbox of a road vehicle. In a third aspect of the proposed technology, a gearbox is provided that comprises the shaft assembly according to the second aspect of the proposed technology.

It is understood that the wet clutch is configured to be mounted on the shaft. The clutch basket being attached to the gear wheel and the gear wheel being rotationally supported with respect to the shaft means that the clutch basket is also rotationally supported with respect to the shaft. It is understood that the clutch basket is rotationally fixed relative to the gear wheel. It is further understood that the clutch hub and the clutch basket can spin at different speeds when they are unlocked in the unengaged state, and that they spin at the same speed when they are locked together in the engaged state. It is understood that the gear wheel and the back part extend radially relative to the shaft, and that the shaft may define a rotational axis.

The back part may be positioned, or at least partly positioned, between the clutch pack and the gear wheel. The back part being spaced apart from the gear wheel in the unengaged state is understood to encompass the back part and the gear wheel being separated and forming a gap between them. The gap may be less than 1 mm, less than 0.5 mm, or less than 0.1 mm. The back part engaging the gear wheel in the engaged state is understood to encompass the back part and the gear wheel contacting, or pressing against, one another.

The gear assembly, and in extension the gear wheel and the wet clutch, may form a through-going hole for receiving the shaft. In the shaft assembly, the shaft may pass through the complete gear assembly. This means that the shaft passes through the wet clutch and the gear wheel, and in extension through the clutch hub, the front part, the back part, the clutch basket, and the clutch pack. The front part may be juxtaposed, or attached, to the clutch hub. Similarly, the back part may be juxtaposed, or attached, to the clutch hub. The clutch hub and the clutch basket may be concentric relative to the shaft. Similarly, the front part, the rear part, the actuator, and the gear wheel may be concentric relative to the shaft.

The back part and the gear wheel engaging one another has the effect that the gear wheel is prevented from shifting axially along the shaft towards the front part. The clutch basket will be stabilized and supported in one direction along the shaft in the engaged state. This will relieve any bearing that supports the clutch basket from axial loads along the shaft, which is particularly important at high axial loads and high rotational velocities.

The gear wheel may be a monolithic structure. Alternatively, it may be a composite structure composed of a plurality of parts. The back part may be a monolithic structure. The monolithic gear wheel and the monolithic back part may be of steel.

When going from the unengaged state to the engaged state, the back part and gear wheel may engage one another after reaching the engaged state. When going from the unengaged state, the clutch basket may reach the engaged state at a first force generated by the actuator, and the back part and the gear wheel may engage one another at a second force generated by the actuator that is greater than the first force. Here, it is understood that the state of the clutch pack transitions from unengaged to engaged at an increase in the force supplied by the actuator.

When going from the engaged state to the unengaged state, the back part and gear wheel may disengage from one another before reaching the unengaged state. When going from the engaged state, the clutch basket may reach the unengaged state at a third force generated by the actuator, and the back part and the gear wheel may disengage from one another at a fourth force generated by the actuator that is greater than the third force. Here, it is understood that the state of the clutch pack transitions from engaged to unengaged at a decrease in the force supplied by the actuator.

The back part may be configured to elastically deform and engage the gear wheel when the clutch pack is in the engaged state. Here, it is understood that the deformation is caused by the clutch pack being pressed against the back part by actuator. The deforming of the back part may encompass the back part bending, or a portion of the back part shifting towards the gear wheel. For example, it may be a radially outer portion of the back part that shifts towards the gear wheel.

In the engaged state, the gear wheel may generate, or be subjected to, an axial load, or axial thrust, along the shaft, at a meshing with a cooperating gear wheel. For example, this may be at a transfer of torque to the cooperating gear wheel. The gear wheel may be a helical gear wheel, which can give a corresponding axial load. The direction of the axial load typically depends on the rotational direction of a helical gear wheel.

The axial load may push the gear wheel in the direction of, or towards, the back part, whereby the back part engages (or contacts) the gear wheel, or the load pushes the gear wheel and the back part into contact, or engagement. It is understood that the torque transferred to the cooperating wheel is in a direction resulting in the axial load being towards the back part. The back part is fixed relative to the shaft, which prevents any further axial shifts and reduces axial loads on any bearings supporting the gear wheel.

The back part may have, or form, a first contact area, or first contact surface, facing the gear wheel, and the gear wheel may have, or form, a second contact area, or second contact surface, facing the first contact area, wherein the first contact area engages the second contact area in the engaged state.

The first contact area and the second contact area may be separated in the unengaged state. They may also form, or define, the gap between the back part and the gear wheel in the unengaged state. The first contact area may be flush, or mate, or cooperate, with the second contact area in the engaged state. The first contact area may also conform to the second contact area in the unengaged state with a gap between the two areas. It is understood that the contact areas can have a high aspect ratio. For example, each of the first contact area and the second contact may be an annular disc with a narrow width, that is with inner and outer edges that are circular, concentric, and separated by a width that is less than 10% of the radius of the inner edge, such as less than 5% or less than 1%.

The first contact area and the second contact area may have a planar geometry at a right angle to the shaft, or to the axis of rotation. They may be concentric relative to the shaft.

Additionally, or alternatively, the first contact area may define a male contact and the second contact area may define a cooperating female contact. The first contact area and the second contact area may have a frustoconical geometry concentric with, or rotationally symmetric relative to, the shaft, or to the axis of rotation. This may be in addition to the above-mentioned planar geometry. The wide end of the frustoconical geometry may be in the direction of, or face, the front part, and the narrow end of the frustoconical geometry may be in the direction away from, or face away from the front part. Additionally, or alternatively, the first contact area and the second contact area may have a curved, or smoothly curved, geometry concentric. The geometry may be rotationally symmetric with respect to, the shaft, or to the axis of rotation.

The first contact area and the second contact area may have a first and a second contact surface, respectively, that are smooth. This reduces friction between the back part and the gear wheel.

The back part may comprise a plate-like portion, or structure, extending radially with respect to the clutch hub, or the shaft. The plate-like portion may be a flange or disc-like. It may be concentric relative to the shaft. The actuator may press the clutch pack against the plate-like portion in the engaged state, and the plate-like portions of the back part may engage the gear wheel in the engaged state. The first contact area may be located on the plate-like portion. The plate-like portion, or the complete pressure plate, may have planar geometry.

The back part may have one or more axially throughgoing holes or openings. Additionally, or alternatively, it may have one or more cutouts. The cutouts may be at the radially outer edge of the back part. The holes or cutouts may be located on the plate-like portion of the back part This allows for a greater flexibility of the back part in a direction along the shaft and a greater deformation for a given force generated by the actuator.

The clutch basket may comprise, or be composed of, a cylindrical portion that is attached to the gear wheel. Alternatively, the clutch basket may comprise, or be composed of, a radial portion and a cylindric portion, wherein the radial portion is located at, or attached to, the gear wheel. The back part and the cylindrical portion may be separated in the engaged state. This means that there will be no wear on the clutch basket during operation. It is understood that the radial portion extends radially relative to the shaft. The cylindrical portion may connect to and extend from the radial portion in the direction of the front part. It is understood that the radial portion and the cylindrical portion are concentric relative to the shaft.

The clutch pack may comprise a plurality of inner plates attached, or connected, to the clutch hub and a plurality of outer plates attached to, or connected to, the clutch basket. It is understood that the clutch pack is a multiple-plate clutch pack with the inner and outer plates stacked to form the clutch pack. For example, the inner plates may be driving plates and the outer plats may be driven plates.

The outer plates may be attached, or connected, to the cylindrical portion of the clutch basket. It is understood that the plates are slidably attached allowing for an axial shift in position. This way, the inner plates and the outer plates can be separated in the unengaged state and pressed together in the engaged state.

The back part may have an outer edge. The first contact area of the back part may be radially separated from the outer edge. The radial portion of the clutch basket may have an inner edge that is closer to the shaft than the outer edge of the back part. This means that the outer edge of the back part may be at a first radius relative to the shaft, and the inner edge of the radial portion may be at a second radius relative to the shaft that is smaller than the first radius.

The back part may comprise, or be composed of, an inner portion and an outer portion. The inner portion may be rotationally symmetric relative to the shaft. Similarly, the outer portion may be rotationally symmetric relative to the shaft. It is understood that the inner portion is located closer to the shaft than the outer portion. It is further understood that the inner portion and the outer portion are connected or juxtaposed.

The back part may further have, or form, a support area facing the clutch pack, wherein the clutch pack is pressed against, or engages, the support area, in the engaged state. It is understood that the support area extends radially relative to the shaft. The complete support area may be positioned on the outer portion of the back part. Alternatively, the support area may in part be positioned on the outer portion of the back part and in part positioned on the inner portion of the back part.

In one alternative, the outer portion may engage the gear wheel in the engaged state. The first contact area may be positioned on, or formed by, the outer portion. Here, it is understood that the inner portion is separated from the gear wheel, or the radial portion of the clutch basket, in the engaged state, which means that it does not engage the gear wheel.

In another alternative, the inner portion may engage the gear wheel in the engaged state. The first contact area may be positioned on, or formed by, the inner portion. It is understood that the outer portion is separated from the gear wheel, or the radial portion of the clutch basket, in the engaged state. Thus, it does not engage the gear wheel.

The clutch pack may further have: a slipping state in which the clutch hub and the clutch basket are partly locked together and can spin at different speeds, wherein the clutch pack changes from the unengaged state to the engaged state via the slipping state at an axial compression, or compression along the shaft, of the clutch pack. In the slipping state, torque may be transferred between the inner plates and the outer plates by kinetic friction between the two types of plates. This means that there is a slipping mechanical coupling between the clutch hub and the clutch basket. In the engaged state, the torque may instead be transferred by static friction. This means that there is a non-slipping mechanical coupling between the clutch hub and the clutch basket. In the unengaged state, no torque is mechanically transferred there between. A torque transfer caused only by a fluid coupling of the coolant is not considered a mechanical torque transfer in this context.

The gear assembly may further comprise: a first rolling bearing, or first rolling-element bearing, rotationally supporting the gear wheel relative to the shaft. Additionally, the gear assembly may further comprise: a second rolling bearing, or second rolling-element bearing, rotationally supporting the gear wheel relative to the shaft. The first rolling bearing and the second rolling bearing may be juxtaposed.

The shaft may comprise an internal shaft conduit for a lubricant. It is understood that the lubricant also can have the function of a coolant. The gear assembly may further comprise: a bearing conduit configured to operationally connect to the internal shaft conduit and to release the lubricant at the first rolling bearing and/or at the second rolling bearing. It may be configured to release the lubricant between the first rolling bearing and the second rolling bearing. In the shaft assembly, the bearing conduit is instead operationally connected to the internal shaft conduit.

For example, the shaft may be hollow and form a cylindrical tube with an inside constituting the internal shaft conduit. The tube may further have an aperture, or form a hole, through which the lubricant can pass. The bearing conduit may have an inlet connected to the aperture and an outlet from which the lubricant is released. The outlet may be positioned between the first rolling bearing and the second rolling bearing.

It is understood that the rolling bearings are concentric relative to the shaft. The rolling bearings may be radial rolling bearings. More specifically, the rolling bearings may be angular contact ball bearings. They may be positioned in a back-to-back configuration. The radial rolling bearings may define an axial rest position along the shaft for the gear wheel. It is understood that the rest position is the position without any axial load on the gear wheel. The rolling bearings may allow for an axial shift, or a shift along the shaft, of the gear wheel, for example in the direction of, or towards, the back part. The axial shift may be in the engaged state. Additionally, or alternatively, the axial shift may be greater than the gap between the back part and the gear wheel in the unengaged state.

Each of the first rolling bearing and the second rolling bearing may comprise an inner race, an outer race, and a plurality of rolling-elements, such as balls. It is understood that the rolling elements are positioned between the inner race and the outer race. The outer race may be attached, or fixed, to the gear wheel. It may form part of the gear wheel.

The inner race may be attached, or fixed, to the shaft. Alternatively, the gear assembly may further comprise: a radial spacer configured to be fixed to, or mounted on, the shaft.

In this alternative, the inner race is attached, or fixed, to the radial spacer. The abovementioned axial rest position may be defined by the relative rest positions of the inner race and outer race, at no, or small axial loads. The radial spacer has the effect of a greater radius of the rolling bearing, which allows for greater radial loads on the gear assembly. Additionally, it reduces the mass that rotates relative to the shaft, which allows for a faster response when engaging the wet clutch.

The inner race of the first rolling bearing may contact, be fixed relative to, or be preloaded by the wet clutch, or by the back part of the wet clutch. Here, it is understood that the inner race of the first rolling bearing and the wet clutch are juxtaposed. The inner races of the first rolling bearing and the second rolling bearing may be separated by an axial spacer. The axial spacer may fix, or preload, the inner race of the second rolling bearing relative to the inner race of the first rolling bearing The bearing conduit may, at least in part, be formed by the inner races of the first rolling bearing and the second rolling bearing. For example, the inner races may be separated to allow the lubricant to pass between them. Additionally, the bearing conduit may, at least in part, be formed by the radial spacer.

The gear wheel may have a central through bore, or hole, with a rotationally symmetric inner wall through which the shaft can pass, or passes, in the case of the shaft assembly. The outer race may conform to, or be attached to, the inner wall of the through bore. The radial spacer may have a ring-shaped body. The body may be hollow or partly hollowed. The radial spacer may be attached to, or mounted on, the clutch hub. The clutch hub in turn may be configured to be mounted on and rigidly attached directly to the shaft. This way, the radial spacer is configured to be rotationally fixed relative to the shaft.

The wet clutch may further comprise: a plurality of individual clutch conduits, wherein each clutch conduit has a collar portion formed by the collar and a hub portion formed by the clutch hub. The collar portion has an inlet for receiving the coolant, and the hub portion is coupled to the collar portion and has one or more outlets at the clutch pack for releasing the coolant. The wet clutch may further comprise: a plurality of valves, wherein each valve is operationally connected to a single clutch conduit configured to control the flow of coolant through the clutch conduit. Additionally, the actuator may be configured to simultaneously engage the clutch pack and operate the plurality of valves.

The plurality of clutch conduits allows for a compact construction of the wet clutch. Additionally, the fact that the actuator engages the clutch pack and operates the plurality of valves means that it controls both the operation, or engagement and disengagement, and the cooling of the clutch pack. This joint function also allows for a more compact construction.

The front part may be ring-shaped, and the front part being fixed relative to the shaft and the actuator being supported by the front part allows for a more compact construction, for example in comparison with a wet clutch having the actuator supported by an enclosing housing or casing. The proposed technology also allows for a supply of coolant where it has the greatest effect, which is at the inside of the clutch packs.

The actuator may be a single actuator. This means that there is only one actuator operating the clutch pack and the plurality of valves. The fact that a single actuator can provide this function further contributes to a more compact construction.

The clutch hub may be configured to be rigidly attached directly to the shaft, for example by way of splines. The front part may be rigidly attached to the clutch hub, for example by way of bolts. Alternatively, it may be rigidly attached directly to the shaft. This way, the clutch hub and the front part may be rotationally and axially, or lengthwise, fixed relative to the shaft. When the wet clutch is installed, the fact that the clutch hub and the front part are rotationally and axially fixed relative to the shaft means that they cannot rotate relative to the shaft and cannot shift lengthwise relative to the shaft.

That the gear wheel and in extension the clutch basket are rotationally supported with respect to the shaft, means that they can rotate relative to the shaft, provided that they is not prevented from rotating by the clutch pack.

The clutch hub may constitute a unitary body manufactured from a single piece of material. Similarly, the front part may constitute a unitary body manufactured from a single piece of material. The clutch hub may form a through hole for receiving the shaft. Similarly, the front part, rear part, and gear wheel may form a through hole for receiving the shaft.

The lubricant, or coolant, may be a liquid. The lubricant may be oil-based.

The actuator may be configured to engage the clutch pack when activated. This means that the wet clutch must be actively engaged or locked. When the actuator is deactivated, the clutch pack, and in extension the wet clutch, is disengaged or open.

The plurality of individual clutch conduits may comprise ten or more clutch conduits. The hub portion of each clutch conduit may be elongated and aligned with the shaft or extend in parallel with the shaft. Each hub portion may have a cylindrical portion, which means that the portion is shaped like a cylinder. It may have a circular cross-section. The cylindrical portion may have an axis that is parallel to the shaft, or to the axis of the shaft. The cylindrical portions of all hub portions may have parallel cylinder axes. The features specified here enable a compact conduit arrangement, which in turn allows for a more compact wet clutch.

The through hole of the front part may have has a circumferential inner wall portion facing the shaft, and the front part forms a circumferential groove, or channel, in the inner wall portion for receiving the coolant from the internal shaft conduit, wherein the inlet of the front part portion of each clutch conduit connects to the groove. For example, the internal shaft conduit may have an outlet and when the wet clutch is installed, the circumferential groove may be located at and in fluid communication with the outlet. For example, if the shaft is a cylindrical tube with an inside constituting the internal shaft conduit, the single outlet may be an aperture, or hole, in the tube. The inner wall portion facing the shaft may be configured to be flush with the shaft and prevent coolant from leaking between the front part and the shaft.

The front part portions of the clutch conduits may be evenly distributed around the shaft. Similarly, the hub portions of the clutch conduits may be evenly distributed around the shaft. The distribution around the shaft is understood to be an angular distribution with respect to the rotational axis of the shaft. For example, if there are 12 front part portions, there is a 30-degree separation with respect to the rotational axis of the shaft between the centers of neighboring front part portions.

The plurality of clutch conduits and the groove may form part of, or constitute, a conduit arrangement configured to operationally connect the shaft conduit to the outlets and to allow a flow of coolant there between. The conduit arrangement then constitutes a manifold distributing the coolant. Each clutch conduit may be configured to operationally connect to the internal shaft conduit for receiving a lubricant, or coolant, therefrom. In the shaft assembly, each clutch conduit is instead operationally connected to the internal shaft conduit.

Each clutch conduit, or hub portion, may have a plurality of outlets that are distributed axially with respect to the clutch hub. In extension, this means that outlets are distributed axially with respect to the shaft. Alternatively, each clutch conduit, or hub portion, may have a single outlet that is elongated and extends axially with respect to the clutch hub. This allows for an axial distribution of the coolant, which in turn allows for clutch packs with a greater number of plates and a reduced diameter, thus contributing to a more efficient and compact wet clutch.

The clutch hub and the clutch pack may form, or be connected by, a spline joint, wherein the spline joint comprises a plurality of axially extending ridges and grooves in the clutch hub. The one or more outlets of each clutch conduit may then be located at the bottom of a single groove. In an alternative wording, the spline joint may comprise a plurality of male splines in the clutch hub, and the one or more outlets of each clutch conduit may be located between two neighboring male splines. The number of ridges or male splines may be an integer multiple of the number of clutch conduits. For example, the number of clutch conduits may be fifteen and the number of male splines may be forty-five, corresponding to an integer multiple of three. The plurality of axially extending ridges and grooves may form a male spline cooperating with a female spline formed by the clutch pack.

The clutch pack may be concentric with respect to the clutch hub, and in extension with respect to the shaft. The clutch basket may be concentric with respect to the clutch pack, and in extension with respect to the clutch hub. The clutch pack may have an annular shape and extend both radially and axially with respect to the clutch hub, and in extension with respect to the shaft.

The inner plates can move axially relative to the clutch hub and are rotationally, or angularly, fixed relative to the clutch hub, and the outer plates can move axially relative to the clutch basket and are rotationally, or angularly, fixed relative to the clutch basket. This means that the clutch hub constitutes an inner plate carrier, and the clutch basket constitutes an outer plate carrier.

The inner and outer plates may be positioned alternately in the clutch pack. In the unengaged state there is no mechanical friction between the inner plates and the outer plates, in the slipping state there is a kinetic friction between the inner plates and the outer plates, and in the engaged state there is a static friction between the inner plates and the outer plates.

The actuator may be configured to compress the clutch pack axially. The clutch pack may change from the unengaged state (a) to the engaged state (c), via the slipping state (b), when it is compressed axially.

The clutch pack may form a plurality radially extending channels for the coolant between the inner and outer plates, or through the clutch pack, when the clutch pack is in its engaged state. The channels may be formed in the inner plates and define a square or rectangular grid pattern. The radially extending channels contribute to an efficient cooling of the clutch pack.

The clutch hub may have a plurality of male splines and each of the plurality of inner plates may have a plurality of female splines cooperating with the plurality of male splines of the clutch hub. The clutch basket may have a plurality of female splines and each of the plurality of outer plates may have a plurality of male splines cooperating with the plurality of female splines of the clutch basket.

The valve may: (i) prevent, or limit, the flow of coolant when the clutch pack is in its unengaged state, (ii) allow the flow of coolant when the clutch pack is in its slipping state, and (iii) allow the flow of coolant when the clutch pack is in its engaged state. The flow of coolant may be greater when the clutch pack is in its engaged state than when it is in its slipping state. For example, the flow in the slipping state may be in the range 70% to 100%, or 90% to 100% of the flow in the engaged state.

The wet clutch may further comprise an annular pressure plate concentric relative to the shaft and positioned between the actuator and the clutch pack, and the pressure plate may be configured to engage the clutch pack. The pressure plate may form part of each valve. It is understood that the position of the pressure plate can shift axially, or along the shaft. The pressure plate may be planar or have planar geometry. For each valve, the front part may form a valve seat at the coupling, or connection, between the hub portion and the front part portion of the clutch conduit to which the valve is connected. The seat may be a hard seat that is integral with the front part. This means that there is no elastomer gasket providing the sealing. The pressure plate may be disk-shaped and/or have rotational symmetry with respect to the shaft. It may have a central hole and the pressure plate may have, or form, a plurality of protrusions, or lugs, each extending radially inwards in the central hole, or with respect to the central hole. Each protrusion of the pressure plate may constitute a valve member, or valve disc, of a single valve of the plurality of valves. The protrusion may contact, or seal against, the valve seat of the valve when the wet clutch is in its unengaged state. In its engaged state, the wet clutch may present a gap between the protrusion and the valve seat, thus allowing a flow of the lubricant past the protrusions and into the hub portions.

The pressure plate may form part of or be integral with the actuator. In the slipping state and in the engaged state, the clutch pack may be axially loaded by the pressure plate.

The wet clutch may further comprise a plurality of springs individually positioned in the hub portions of the plurality clutch conduit, wherein each spring engages, or biases, the pressure plate. This means that there is a spring in the hub portion of each clutch conduit. It is understood that the spring biases, or pushes, the pressure plate towards the actuator, or front part.

If the hub portions have cylindrical portions, the springs may be positioned in the cylindrical portions of the hub portions. Each spring may engage the protrusion of the pressure plate. Provided that the protrusions form parts of the valves, this means that the springs jointly act to close the valves. Each spring may be a compression coil spring and oriented to compress and extend parallel to the shaft.

The pressure plate, or the protrusion, may block the front part portions of the clutch conduits, when the clutch pack, or wet clutch, is in its unengaged state. This way, the coolant is prevented from flowing through the clutch conduits and reaching the clutch pack.

The actuator may comprise: an annular recess formed by the front part and concentric with the shaft, and a ring-shaped piston positioned in the recess and configured to move axially relative to the shaft.

The annular recess may face, or be open in the direction of, the clutch pack or the pressure plate. The ring-shaped piston may engage or contact the annular pressure plate. In the slipping state and in the engaged state, the ring-shaped piston axially loads, or presses against, the pressure plate. The plurality of springs may bias, or push, the pressure plate towards, or against, the ring-shaped piston.

The shaft may have an additional internal shaft conduit for a hydraulic fluid and the actuator may be configured to operationally connect to the additional internal shaft conduit. More precisely, the annular recess may be configured to connect to, or for a fluid communication with, the additional internal shaft, for example by way of a connecting conduit. When installed, this means that the actuator is activated by increasing the pressure of the hydraulic fluid, which causes the ring-shaped piston to move towards the clutch pack, or the pressure plate, and engage the wet clutch. In the shaft assembly, it is understood that the actuator instead is operationally connected to the additional internal shaft conduit.

The back part has the function of an abutment, or end plate, against which the clutch pack is pressed by the actuator. In the slipping state and in the engaged state, the clutch pack is then axially loaded by the pressure plate and the back part. The back part may be concentric with respect to the shaft. It may have an annular shape. The back part allows for a compact construction of the wet clutch.

The clutch basket may have a cylindrical shape or may be ring-shaped. This means that the clutch basket has a limited radial extent and that it does not form an end plate extending in the radial direction. The clutch basket comprises, or forms, a plurality of apertures for allowing the coolant to escape the wet clutch in the radial direction. This means that the wet clutch is not sealed, and that the coolant is not contained in the wet clutch. Thus, no circulation system for the coolant is required within the wet clutch as such, which allows for a more compact construction. Instead, the coolant may be circulated by an external system. Additionally, this allows for the wet clutch to be free from coolant when the wet clutch, or clutch pack, is not engaged. Additionally, or alternatively, there may be a gap between the clutch basket and the front part through which the coolant can escape the wet clutch.

The shaft may have an additional internal shaft conduit for a hydraulic fluid and the actuator may be configured to operationally connect to the additional internal shaft conduit. In the shaft assembly, the actuator is instead operationally connected to the additional internal shaft conduit.

The gear wheel may have, or form, an axially extending flange concentric with the shaft, wherein the clutch basket and the flange overlap. The clutch basket may be attached to the flange. The clutch basket and the flange may have conforming shapes at the overlap. The outer side of the flange may conform to the inner side of the clutch basket at the overlap.

It is understood that the term "gear wheel" does not encompass sprockets, or sprocket-wheels, commonly used for meshing with chains, belts, or the like.

BRIEF DESCRIPTION OF THE DRAWINGS

A more complete understanding of the abovementioned and other features and advantages of the proposed technology will be apparent from the following detailed description of preferred embodiments of the proposed technology in conjunction with the appended drawings, wherein.

DETAILED DESCRIPTION OF THE DRAWINGS

Figure 1:
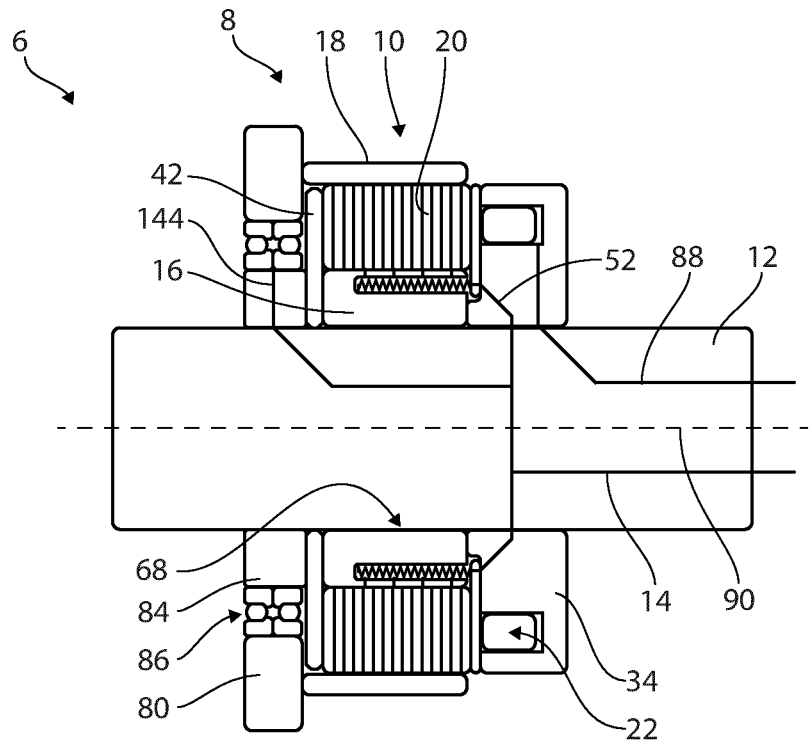
FIG. 1 schematically illustrates an embodiment of a shaft assembly with a gear assembly mounted on a shaft, FIG. 2 schematically illustrates a cross-section of the gear assembly shown in FIG. 1 with the rotationally supported parts separated from the fixed parts, FIGS. 3a-b schematically illustrate an axially supporting function of the gear assembly shown in FIG. 1, FIGS. 4a-b schematically illustrate another axially supporting function of the gear assembly shown in FIG. 1, FIGS. 5a-b schematically illustrate an axially supporting function of an alternative embodiment of a gear assembly, FIGS. 6a-b schematically illustrate another axially supporting function of the alternative embodiment of a gear assembly shown in FIGS. 5a-b, FIG. 7a schematically illustrates a close up of the connection between the clutch basket and the gear wheel in the gear assembly of FIG. 1, FIGS. 7b-c schematically illustrate close ups of the connection between the clutch basket and the gear wheel in alternative embodiments, FIG. 8a schematically illustrates the back part of the gear assembly of FIG. 1, FIGS. 8b-c schematically illustrate back parts in alternative embodiments.

FIG. 1 schematically illustrates a shaft assembly 6 for a gearbox of road vehicle. The shaft assembly 6 has a shaft 12 with an internal shaft conduit 14 intended for carrying a combined coolant and lubricant that is oil based. It also has a gear assembly 8 that is mounted on the shaft 12 and connected to the internal shaft conduit 14. The gear assembly 8 forms a through hole 68 receiving the shaft 12, whereby the shaft 12 passes through the complete gear assembly 8.

The gear assembly 8 has a gear wheel 80 that is rotationally supported with respect to shaft 12. It also has a wet clutch 10 that is mounted on the shaft 12 and operationally connected to the internal shaft conduit 14.

The gear wheel 80 and the wet clutch 10 are concentric with respect to the shaft 12. The gear wheel 80 has an axially extending flange 82 that is also concentric with the shaft 12. The clutch basket 18 and the flange 82 overlap at the flange 82. The outer side of the flange 82 conforms to the inner side of the clutch basket 18 at the overlap, whereby the clutch basket 18 is attached to the flange 82, and in extension to the gear wheel 80, which can be seen in FIGS. 7a and 9.

The wet clutch 10 is a multi-plate clutch and the shaft 12 passes through the complete wet clutch 10. The wet clutch 10 has a clutch hub 16 that is mounted on the shaft 12 and radially fixed relative to the shaft 12 by way of splines 102. It further has a clutch basket 18 that is rotationally supported relative to shaft 12 and a clutch pack 20 that connects the clutch hub 16 and the clutch basket 18. The wet clutch 10 also has a front part 34 that is juxtaposed and attached to the clutch hub 16 by way of bolts. This way, the front part 34 is mounted on and rotationally fixed relative to the shaft 12.

The clutch hub 16 and the clutch basket 18 are concentric with respect to the shaft 12. The clutch hub 16 forms a through hole 62 and the front part 34 forms another through hole 64, see FIG. 9. This means that the clutch hub 10 forms a through hole 66 that receives the shaft 12.

Figure 9:
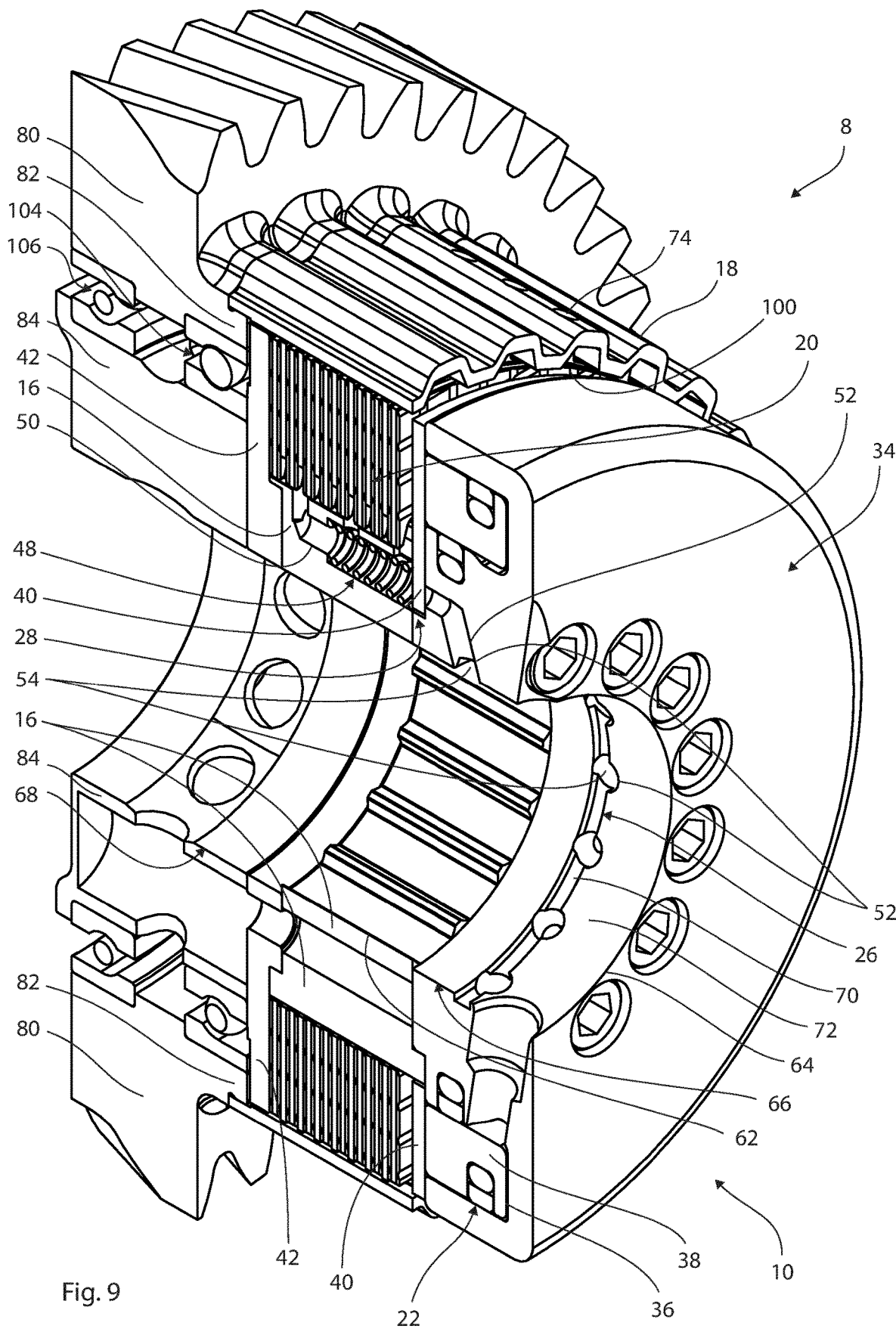
FIG. 9 illustrates a perspective cross-section of the gear assembly shown in FIG. 1.

The gear assembly 8 has a radial spacer 84 that is rotationally fixed relative to the clutch hub 16 by way of bolts. Thus, it is also rotationally fixed relative to the shaft 12. The gear assembly 8 further has a first rolling bearing 104 and a second rolling bearing 106 rotationally supporting the gear wheel 80 relative to the shaft 12. The rolling bearings 104 and 106 are radial rolling bearings, more precisely angular contact ball bearings, positioned in a back-to-back configuration, for example as shown in FIGS. 1 and 9. Each of the first rolling bearing 104 and the second rolling bearing 106 has an inner race 108, an outer race 110, and a plurality of rolling-elements 112 in the form of spherical balls position between the inner race 108 and the outer race 110. The inner race 108 is attached to the radial spacer 84 and the outer race 110 is attached to the gear wheel 80.

Figure 2:
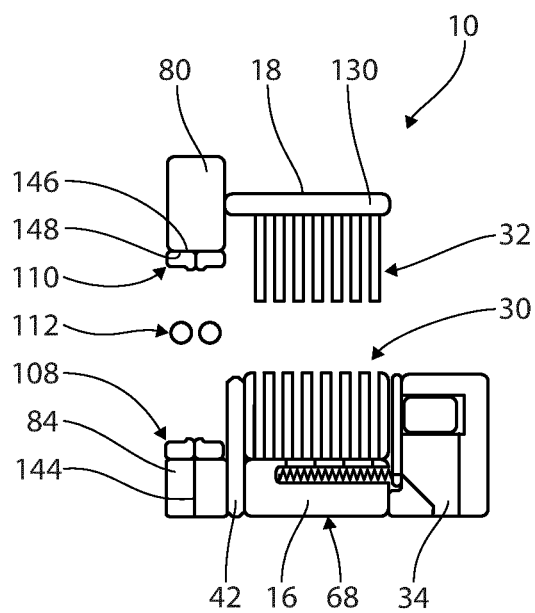
Figure 10:
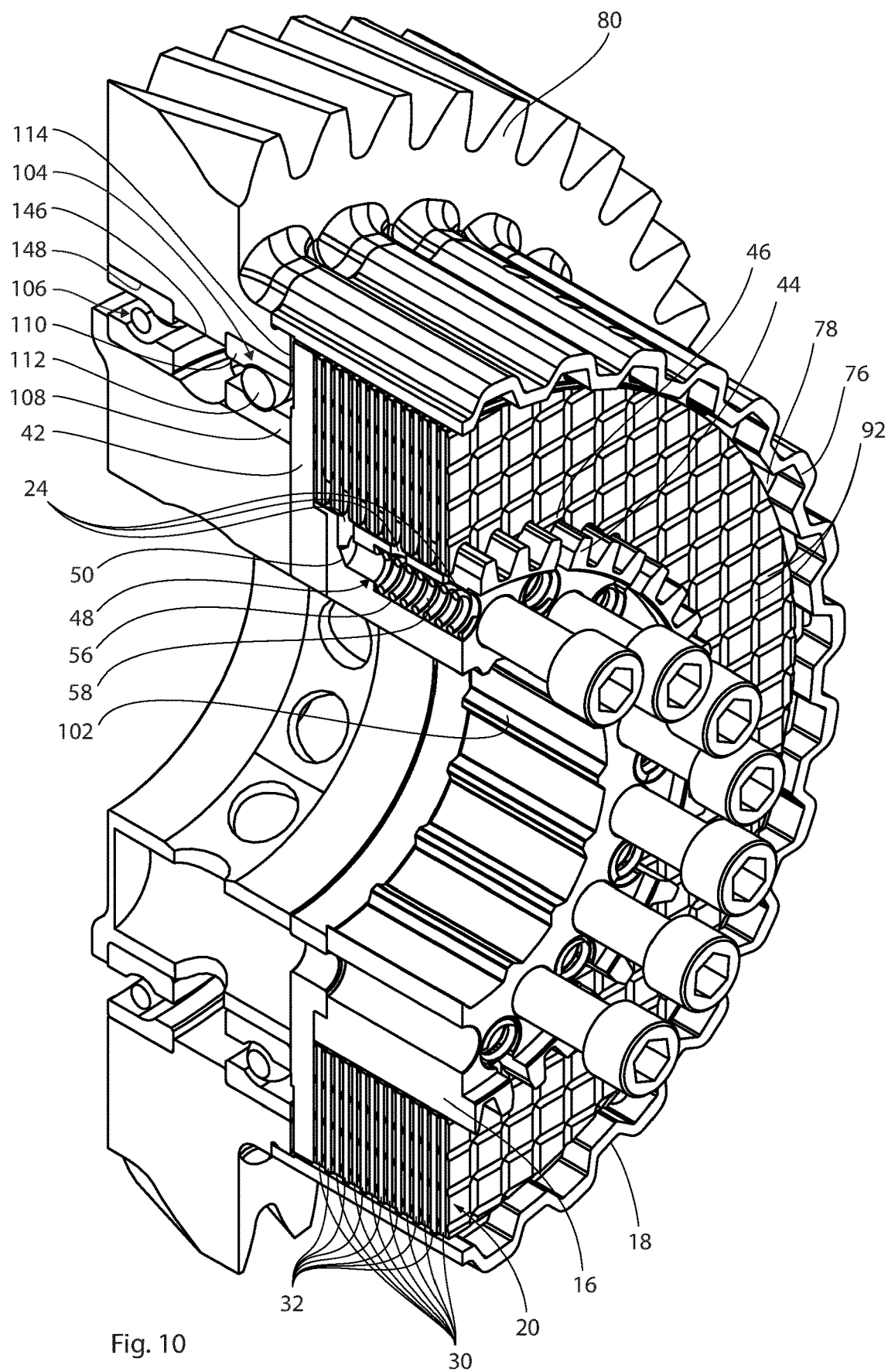
FIG. 10 illustrates a perspective cross-section of a parts at the rear end of the gear assembly shown in FIG. 9.
Figure 11:
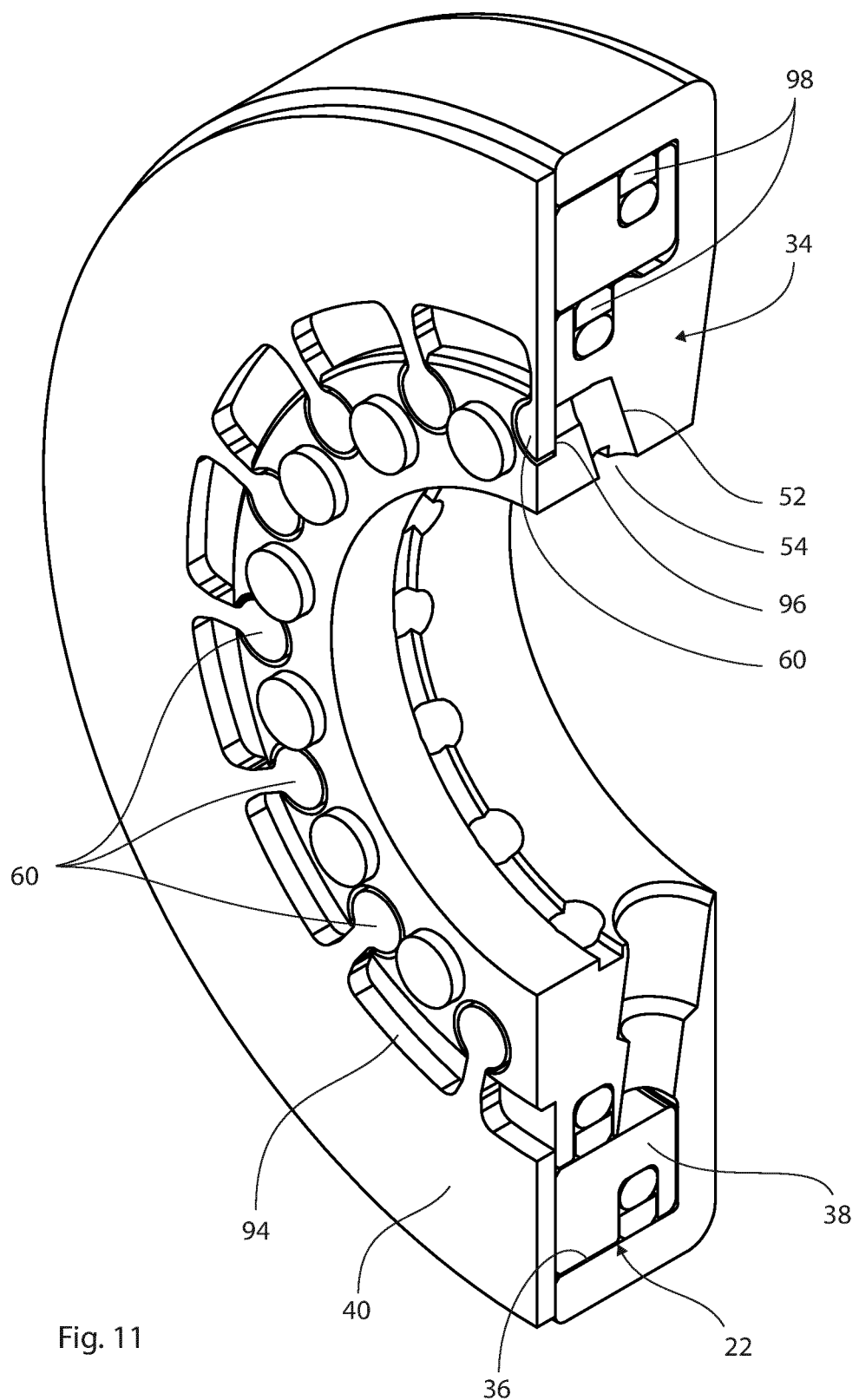
FIG. 11 illustrates a perspective cross-section of parts at the front end of the gear assembly shown in FIG. 9.

The gear wheel 80 has a central through bore 146 with a rotationally symmetric inner wall 148, see for example FIGS. 2 and 10. The outer race 110 conforms to and is attached to the inner wall 148. The radial spacer 84 has a ring-shaped partly hollow body.

The rolling bearings 104 and 106 define an axial rest position for the gear wheel 80 with respect to the shaft 10. The rest position is the position of the gear wheel 80 in the absence of loads or torque transfer. The rolling bearings 104 and 10 can allow for a small axial shift, which becomes greater when they have been subjected to wear.

The inner race 108 of each rolling bearing 104 and 106 is attached to the radial spacer 84, while the outer race 110 is attached to the gear wheel 80. The gear wheel 80 has a central through bore 146 with a cylindrical inner wall, and the outer race 110 conforms to and engages the inner wall of the through bore 146.

Clamps (not shown) are positioned on the shaft 12 on either side of the gear assembly 8 that axially fix the wet clutch 10 and the radial spacer 84, and in extension the clutch hub 16, the clutch basket 18, and the front part 34 relative to the shaft 12.

The clutch hub 16 has been manufactured from a single piece of steel. Similarly, the front part 34 has been manufactured from a single piece of steel. This means that both components individually constitute a unitary body.

The wet clutch 10 has 15 individual clutch conduits 48. Each has a front part portion 52 formed by the front part 34 and a hub portion 50 formed by the clutch hub 16. The front part portion 52 has an inlet 54 that can receive the combined coolant and lubricant. The hub portion 50 is coupled to the front part portion 52 and has three outlets at the clutch pack 20 through which the combined coolant and lubricant can be released. The outlets 24 are distributed axially with respect to the clutch hub 16, which means that they are distributed lengthwise with respect to the shaft 12.

The hub portion 50 of each clutch conduit 48 is elongated and aligned with the shaft 12. Each hub portion 50 has a cylindrical portion 56 with a circular cross-section and an axis that is parallel to the axis 90 of the shaft 12, as can be seen in FIGS. 9 and 10. This means that all cylindrical portions 56 have parallel cylinder axes.

The through hole 64 of the front part 34 that receives the shaft 12 has a circumferential inner wall portion 72 facing the shaft 12. The front part 34 forms a circumferential groove 70 in the inner wall portion 72 that can receive the combined coolant and lubricant from the shaft conduit 14, and the inlet 54 of the front part portion 52 of each clutch conduit 48 connects to the groove 70. The inner wall portion 72 facing the shaft 12 is flush with the outer surface of the shaft 12. This way, the individual clutch conduits 48 form part of a conduit arrangement 26 that connects the shaft conduit 14 to the outlets 24. The conduit arrangement 26 allows a flow of combined coolant and lubricant from the shaft conduit 14 to be distributed at the clutch pack 20, thus having the function of a manifold.

The front part portions 52 and the hub portions 50 of the clutch conduits 48 are evenly distributed around the shaft 12. They have a 24-degree separation with respect to the rotational axis 90 of the shaft 12 between neighboring clutch conduits 48.

The clutch hub 16 has a number of axially extending ridges 44 that form part of a spline joint with the clutch pack 20. The outlets 24 of each clutch conduit 48 are located between a pair of neighboring ridges 44, or more precisely at the bottom of the single groove between neighboring ridges 44. There are forty-five ridges 44 and fifteen clutch conduits 48, which means that there are three times more of the former than the latter. The axially extending ridges 44 form male splines 44 cooperating with female splines 46 formed by the clutch pack 20.

The clutch pack 20 has three states. In the first state, or the unengaged state, the clutch hub 16 and the clutch basket 18 are unlocked and can spin at different speeds. In extension, this means that the gear wheel 80 can spin freely relative to the shaft 12. In the second state, or the slipping state, the clutch hub 16 and the clutch basket 18 are partly locked together but can spin at different speeds. This means that some torque is transferred from the shaft 12 to the gear wheel 80. In the third state, or the engaged state, the clutch hub 16 and the clutch basket 18 are locked together and spin at the same speed. This means that all torque supplied to the shaft 12 is transferred to the gear wheel 80.

The wet clutch 10 has 15 valves 28. Each valve 28 controls the flow of combined coolant and lubricant through a single clutch conduit 48. The wet clutch 10 further has a single actuator 22 supported by the front part 34 and an annular pressure plate 40 that is concentric with respect to the shaft 12. The pressure plate 40 is positioned between the actuator 22 and the clutch pack 20 such that it can engage the clutch pack 20 when the actuator 22 is activated. Additionally, the pressure plate 40 forms part of each valve 28, which means that it simultaneously engages the clutch pack 20 and operates the valves 28.

When activated, the actuator compresses the clutch pack 20 axially and the clutch pack 20 changes from the unengaged state to the engaged state, via the slipping state, when it is compressed axially.

The clutch pack 20 is concentric with respect to the clutch hub 16 and the shaft 12. The clutch basket 18 is concentric with respect to the clutch pack 20, and in extension with respect to the clutch hub 16. The clutch pack 20 has an annular shape and extends both radially and axially with respect to the axis of the shaft 90.

The clutch pack 20 has eight inner plates 30 attached to the clutch hub 16, which constitutes an inner plate carrier, and seven interleaved outer plates 32 attached to the clutch basket 18, which constitutes an outer plate carrier. The inner plates 30 can move axially relative to the clutch hub 16 and are rotationally fixed relative to the clutch hub 16. Similarly, the outer plates 32 can move axially relative to the clutch basket 18 and are rotationally fixed relative to the clutch basket 18.

The inner and outer plates 30 and 32 are positioned alternately in the clutch pack 20. In the unengaged state there is no mechanical friction between the inner plates and the outer plates, in the slipping state there is a kinetic friction between the inner plates 30 and the outer plates 32, and in the engaged state there is a static friction between the inner plates 30 and the outer plates 32.

The clutch pack 20 forms channels 92 in a square grid pattern on both sides of each inner plate 30. Even though not radially oriented, the square grid on the circular plate 30 mean that all the channels 92 to some extent extend radially with respect to the shaft 12, which enables the combined coolant and lubricant to flow radially outwards through the clutch pack 20.

As mentioned above, the clutch hub 16 has a number of outer male splines 44 and each inner plate 30 has the same number female splines 46 that cooperated with the male splines 44. Similarly, the clutch basket 18 has female splines 76 and each of the outer plates 32 has male splines 78 cooperating with the female splines 76.

The valves 28 have been constructed to prevent the flow of combined coolant and lubricant through the clutch conduits 48 when the clutch pack 20 is in its unengaged state.

It further allows the flow of the combined coolant and lubricant when the clutch pack 20 is in its slipping state and its engaged state. In some embodiments, the flow of the combined coolant and lubricant is up to ten times greater when the clutch pack 20 is in its engaged state than in its unengaged state, this means that there is a flow even if the valves 28 are in the closed state.

The front part 34 forms a valve seat 96 at each coupling between the hub portions 50 and the front part portions 52 of the clutch conduits 48. The valve seat 96 is a hard seat integral to the front part 34.

The pressure plate 40 is disc-shaped, planar, and has a rotational symmetry with respect to the axis 90 of the shaft 12. It has a central through hole 94 and forms a number of protrusions 60, more precisely 15 protrusions 60, each extending radially inwards in the central hole 94 as illustrated in FIG. 4. Each protrusion 60 constitutes a valve member, or valve disc, of a single valve 28 and seals against one of the valve seats 96 when the wet clutch 10 is in its unengaged state. In its engaged state, the pressure plate 40 is pushed by the actuator 22 such that a gap is formed between the protrusion 60 and the valve seats 96, thus allowing a flow of the combined coolant and lubricant past the protrusions 60 and into the hub portions 50, from where it is expelled via the outlets 24.

A compression coil spring 58 is positioned in the cylindrical portion 56 of each hub portion 50. Each spring 58 engages a single protrusion 60 of the pressure plate 40, and the springs 58 jointly bias the pressure plate 40 with respect to the clutch hub 16 and pushes the pressure plate towards the actuator 22, thus acting to close the valves 28.

A valve is closed when the clutch pack 20, or wet clutch 10, is in its unengaged state, at which the protrusions 60 block the front part portions 52 of the clutch conduits 48. This way, the combined coolant and lubricant is prevented from flowing through the clutch conduits 48 and reaching the clutch pack 20.

The actuator 22 has an annular recess 36 formed by the front part 34 and concentric with the axis 90 of the shaft 12, which can be seen in FIGS. P and 11. It further has a ring-shaped piston 38 positioned in the recess 36 and configured to move axially relative to the shaft 12. The piston 38 is sealed by gaskets 98 preventing leakage of a hydraulic fluid past the piston 38.

The ring-shaped piston 38 engages the annular pressure plate 40. In the slipping state and in the engaged state, the piston 38 presses against and axially loads the pressure plate 40. The plurality of springs 58 provides a counter force pushing the pressure plate 40 against the ring-shaped piston 38. By way of the pressure plate 40, the actuator 22 is configured to simultaneously engage the clutch pack 20 and operate the plurality of valves 28.

The shaft 12 has an additional internal shaft conduit 88 for a hydraulic fluid, and the annular recess 36 is connected to the additional internal shaft conduit 88. The actuator 22 is activated by increasing the pressure of the hydraulic fluid, which causes the ring-shaped piston 38 to move towards the clutch pack 20 and engage the wet clutch 10.

The wet clutch 10 further has a radially and outwardly extending back part 42 mounted on and concentric with the shaft 12. The back part 42 is juxtaposed to the clutch hub 16 and the clutch pack 20 is positioned between the back part 42 and the front part 34. The back part 42 is attached to the clutch hub 16 by way of bolts. The clutch pack 20 is pressed against the back part 42 when the clutch pack 20 is engaged by the actuator 22 in the slipping state and in the engaged state of the wet clutch 10.

Figure 3A:
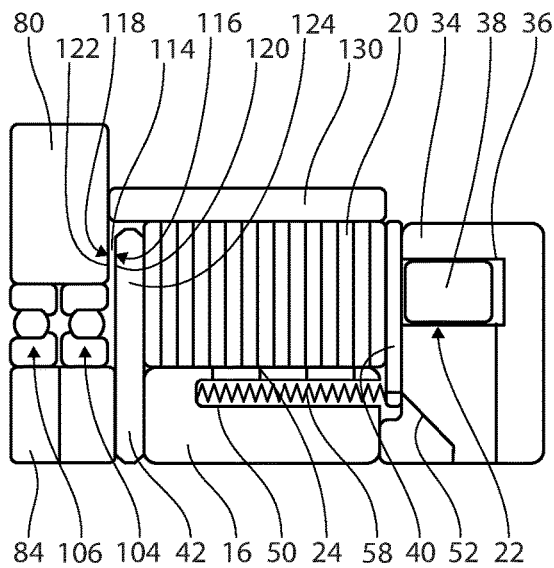
Figure 3B:
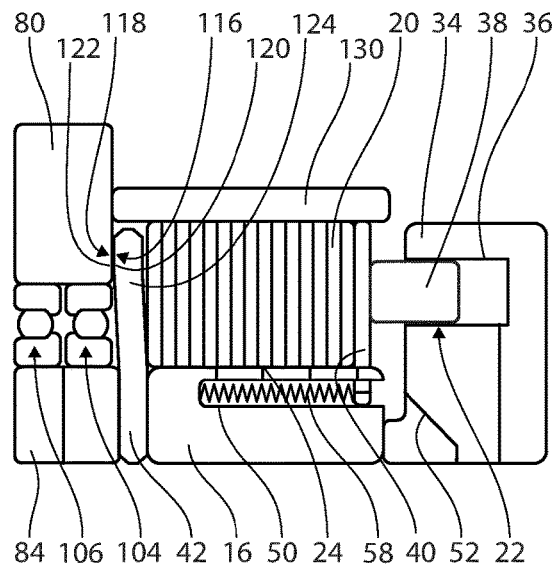
Figure 4A:
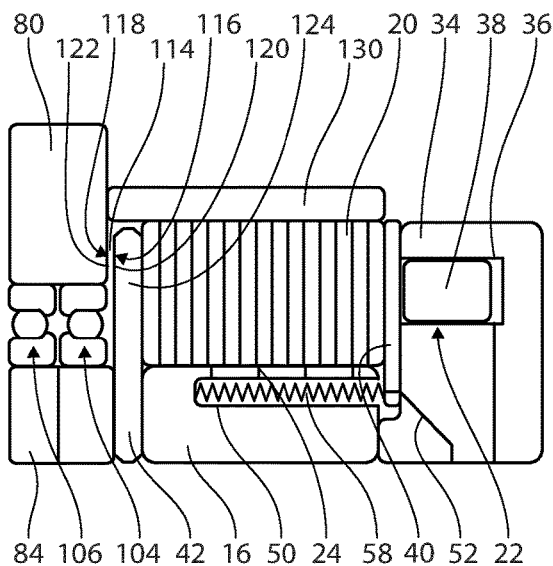
Figure 4B:
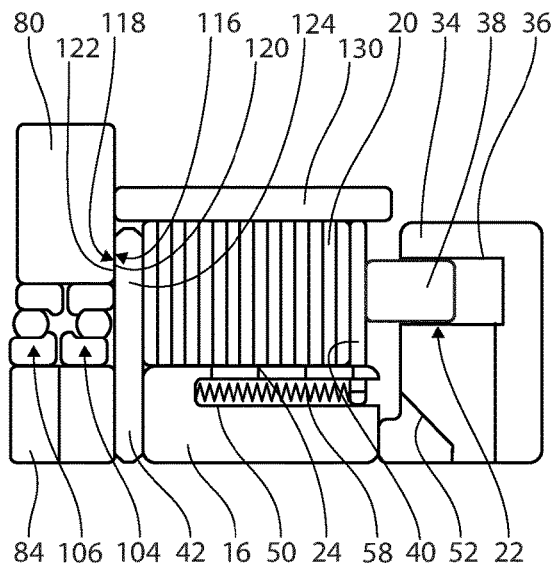

The back part 42 is partly positioned between the clutch pack 20 and the gear wheel 80 The back part 42 and the gear wheel 80 are spaced apart and forms a gap 114 between them in the unengaged state, as can be seen in FIGS. 3a and 4a. The size of the gap 114 is exaggerated to illustrate the function of the back part 42 and gear wheel 80. A gap 114 of about 0.1 mm is shown in the perspective cross-section of FIG. 10. The back part 42 engages the gear wheel 80 in the engaged state, as can be seen in FIGS. 3b and 4b. The contacting between the back part 42 and the gear wheel 80 is a combination of an elastic deformation of the back part 42, as depicted in FIG. 3b, and an axial shifting of the gear wheel 80 towards the back part 42, as depicted in FIG. 4b. In alternative embodiments, the contacting may be cause by either an elastic deformation or a shifting.

The back part 42 and the gear wheel 80 engaging one another has the effect that the gear wheel 80, and in extension the clutch basket 18, are prevented from shifting further towards the front part 34. This way the gear wheel 80 and the clutch basket 18 are stabilized and axially supported in the direction towards the front part 34. This relieves the first rolling bearing 104 and the second rolling bearing 106 from axial loads in the direction of the back part 42.

The gear wheel 80 is a monolithic structure formed from a single piece of steel. Similarly, the back part 42 is a monolithic structure made of a steel that can elastically deform under the load of the actuator 22.

When going from the unengaged state to the engaged state, the back part 42 and the gear wheel 80 engage one another, as is shown in FIGS. 3b and 4b. The clutch basket 18 reaches the engaged state before the back part 42 contacts the gear wheel 80. The engaged state is reached at a first force generated by the actuator 22, and the contacting is achieved at a greater second force generated by the actuator. Conversely, with the cutch basket 18 in the engaged state, the back part 42 and the gear wheel 80 disengage before the clutch basket 18 reaches the disengaged state.

The back part 42 deforms and engages the gear wheel 80 when the clutch pack 20 is in the engaged state, as is shown in FIG. 3b. The clutch pack 20 is pressed against the back part 42, which causes the radially outer part of the back part 42 to bend and contact the gear wheel 80.

The gear wheel 80 is a helical gear that generates an axial load along the shaft 12 when it meshes with a cooperating gear wheel (not shown). The teeth of the gear wheel 80 are oriented such that the gear wheel 80 is pushed towards the back part 42 by the direction of the intended maximum torque. This way, the gear assembly 8 is configured such that the gear wheel 80 engages the back part 42, as is schematically illustrated in FIG. 4b. The back part 42 is fixed relative to the shaft 12 by way of the clutch hub 16, which prevents any further axial shifts of the gear wheel 80.

The back part 42 forms a first contact area 116 facing the gear wheel 80, and the gear wheel 80 forms a second contact area 118 facing the first contact area 116. In the engaged state, the first contact area 116 engages the second contact area 118, as is shown in FIG. 3b. In the unengaged state, the first contact area 116 and the second contact area 118 are separated from one another by the gap 114 between the back part 42 and the gear wheel 80. The first contact area 116 and the second contact area 118 are both planar and at a right angle to the shaft 12, thus conforming to one another in both the unengaged and engaged state.

Figure 7A:
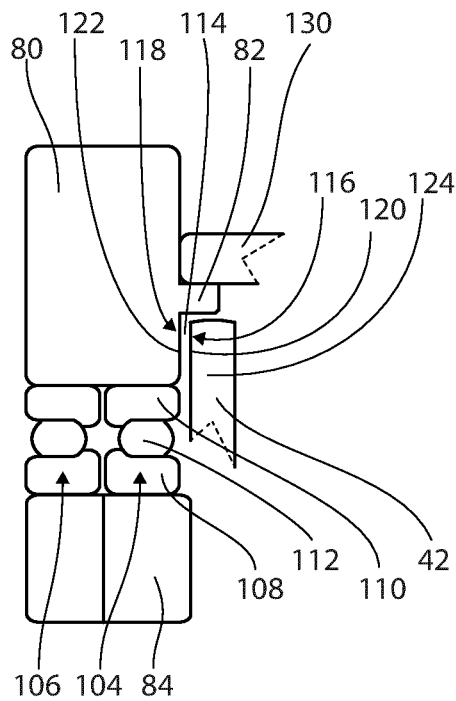
Figure 7B:
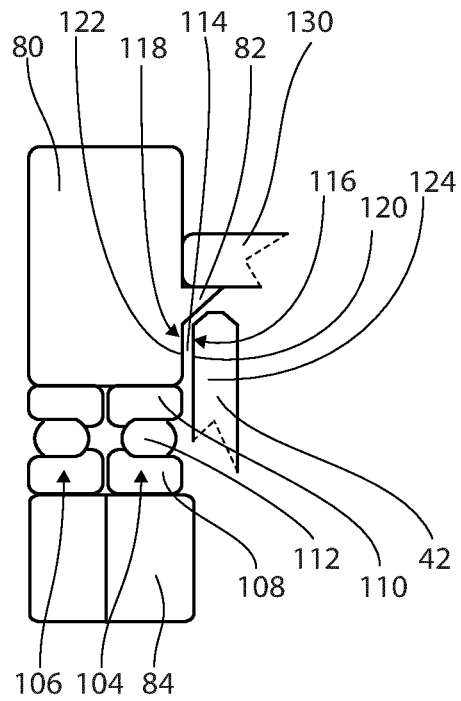
Figure 7C:
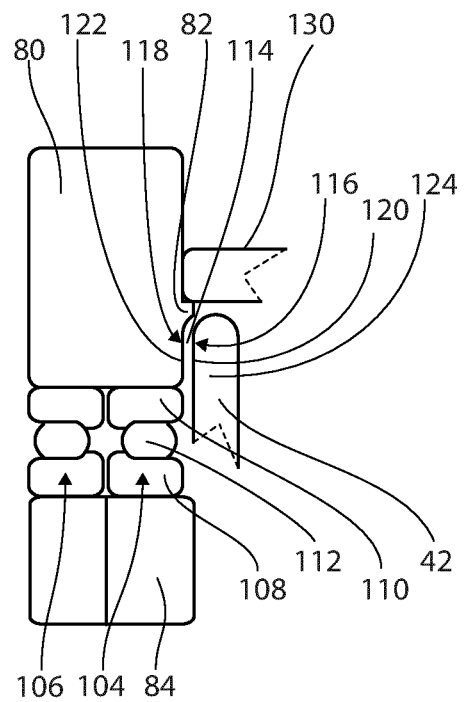

The planar geometry of the first contact area 116 and the second contact area is shown in FIG. 7a. In an alternative embodiment, the first contact area 116 and the second contact area 118 have a frustoconical geometry that is concentric with the shaft 12, as is shown in FIG. 7b. The wide end of the frustoconical geometry is in the direction of the front part 34, and the narrow end of the frustoconical geometry is in the opposite direction. In another alternative embodiment, the first contact area 116 and the second contact area 118 have a curved geometry that is concentric with the shaft 12, as is shown in FIG. 7c. In the two alternative embodiments, the first contact area 116 defines a male contact and the second contact area 118 defines a cooperating female contact.

The first contact area 116 has a smooth first contact surface 120, and the second contact area 118 has a smooth second contact surface 122.

The back part 42 has a plate-like portion 124 that extends radially relative to the shaft 12 to form a flange with planar geometry with respect to the clutch hub 16. The actuator 22 presses the clutch pack 20 against the plate-like portion 124 in the engaged state, and the plate-like portion 124 in turn engages the gear wheel 80. The first contact area 116 is located on the plate-like portion 124.

Figure 8A:
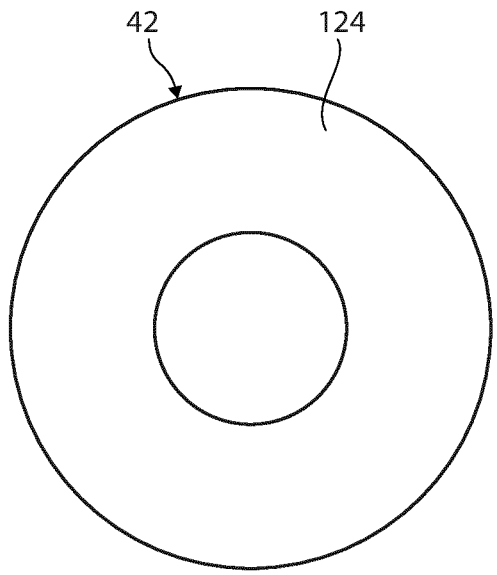
Figure 8B:
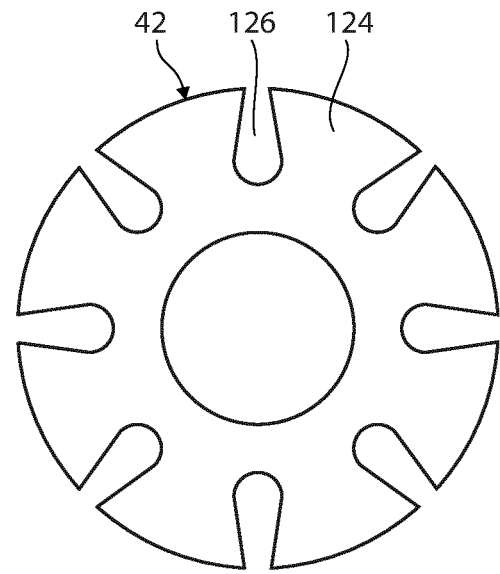
Figure 8C:
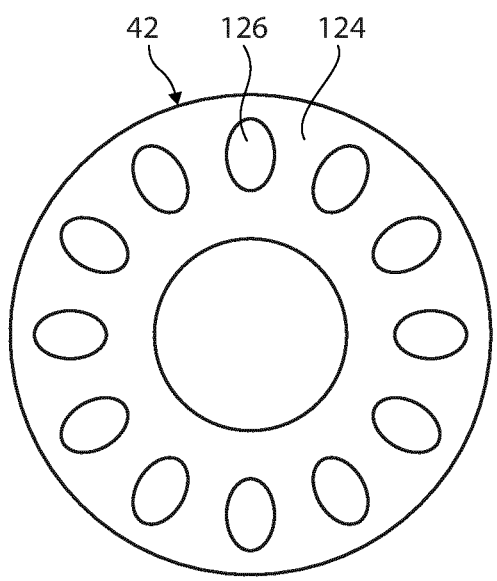

A front view of the back part 42 is shown in FIG. 8a. In an alternative embodiment, the back part 42 has a plurality of cutouts 126 in the radially outer edge of the back part 42, as is shown in FIG. 8b. In another alternative embodiment, the back part 42 has a plurality of axially through-going holes 128. The cutouts 128 and the holes 128 gives a greater flexibility for a given thickness of the plate like portion 124.

The clutch basket 18 is cylindrical and attached to the gear wheel 80 by way of the flange 82, see for example FIGS. 7a and 9. This means that the clutch basket 18 is composed of a cylindrical portion 130. In an alternative embodiment shown in FIGS. 5 and 6, the clutch basket 18 is composed of a radial portion 132 and a cylindric portion 130.

The radial portion 132 is attached to the gear wheel 80. The back part 42 and the cylindrical portion 132 are separated in the engaged state, as can be seen in FIGS. 5b and 6b. The cylindrical portion 130 is connected to and extends from the radial portion 132 in the direction of the front part 34. The outer plates 32 of the clutch pack 20 are slidably attached to the cylindrical portion 130 of the clutch basket 18 allowing for an axial shift in position.

The back part 42 has an outer edge 134. In the alternative embodiments of FIGS. 5 and 6, the first contact area 116 of the back part 42 is radially separated from the outer edge 134. The radial portion 132 of the clutch basket 18 has an inner edge 136 that is closer to the shaft 12 than the outer edge 134 of the back part 42. The outer edge 134 is then at a first radius relative to the shaft, and the inner edge 136 is at a smaller second radius.

Figure 5A:
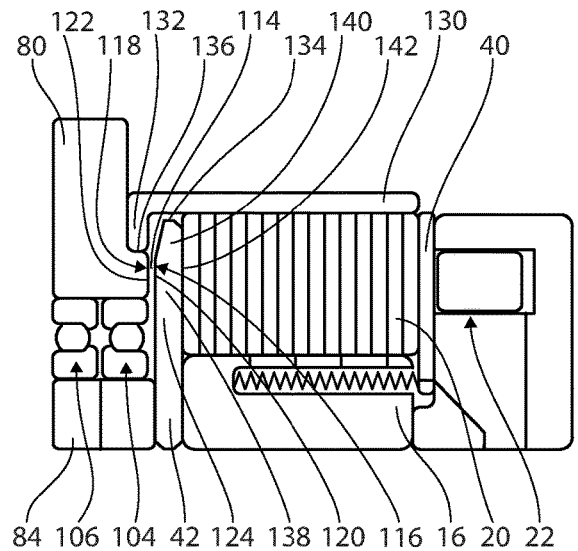
Figure 5B:
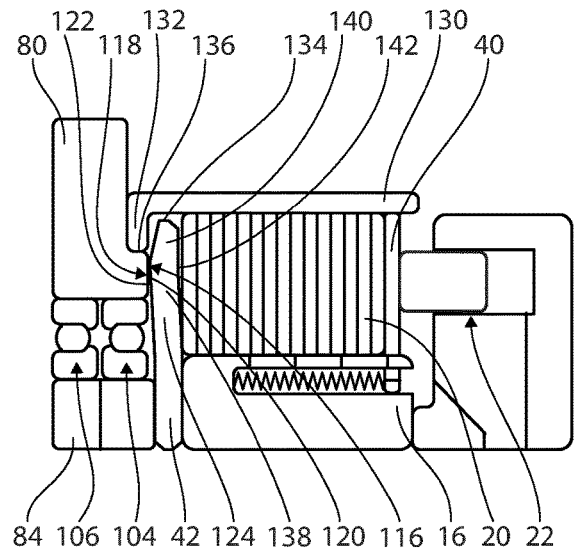
Figure 6A:
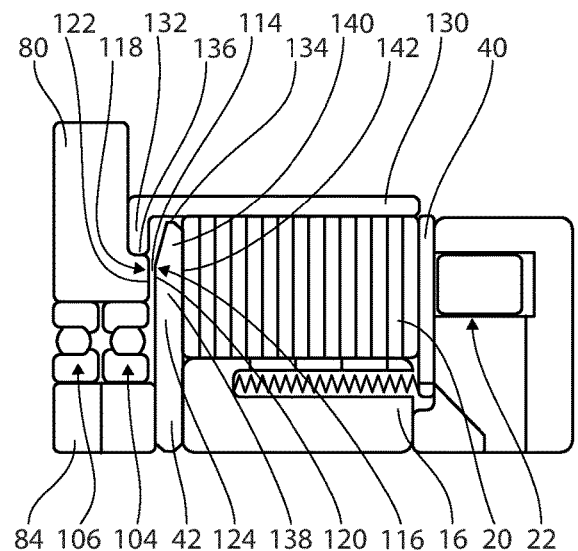
Figure 6B:
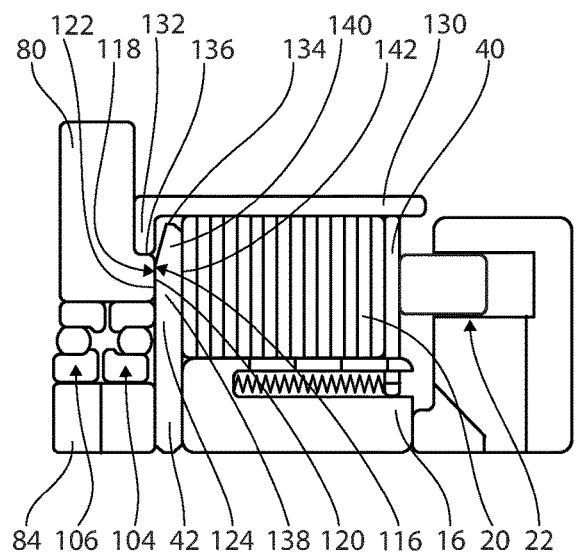

Apart from the clutch basket 18 and the back part 42, the alternative embodiment of FIGS. 5 and 6 has the same features as the embodiment of the main embodiment, for example described in relation to FIGS. 1 to 4.

The back part 42 is composed of an inner portion 138 and an outer portion 140 that are rotationally symmetric relative to the shaft 12. The back part 42 has a radially extending support area 142 that faces the clutch pack 20, and the clutch pack 20 is pressed against the support area 142 in the engaged state. The support area 142 is in part positioned on the outer portion 140 and in part positioned on the inner portion 138.

In the embodiment of FIGS. 3 and 4, the first contact area 116 is formed by the outer portion 140, and the outer portion 138 engage the gear wheel 80 in the engaged state. The inner portion 138 is separated from the gear wheel 80 in the engaged state.

In the alternative embodiment of FIGS. 5 and 6, the inner portion 138 engages the gear wheel 80 instead of the outer portion 140 in the engaged state. The first contact area 116 is or formed by the inner portion 138. The outer portion 140 does not engage the gear wheel 80 in the engaged state.

The gear assembly 8 has a bearing conduit 144 that is formed by the radial spacer 84 and connected to the internal shaft conduit 14. The outlet of the bearing conduit 144 is positioned between the inner races 108 of the first rolling bearing 104 and the second rolling bearing 106, whereby the combined coolant and lubricant in the shaft conduit 14 can be released for lubricating the bearings 104 and 106. This is particularly important for the first rolling bearing 104, which is juxtaposed to the back plate 42 and blocked from the outside by the back plate 42, the gear wheel 80, and the second rolling bearing 106. In the embodiment of FIG. 1, the clutch basket 18 has a cylindrical shape without any radial portion, as can be seen in FIGS. 1, 7a, and 9. It has several apertures 74 through which the combined coolant and lubricant can escape the wet clutch 10 radially. There is also a gap between the clutch basket 18 and the front part 34 through which the combined coolant and lubricant can escape the wet clutch 10.

ITEM LIST 6 shaft assembly
8 gear assembly
10 wet clutch
12 shaft
14 internal shaft conduit for combined coolant and lubricant
16 clutch hub
18 clutch basket
20 clutch pack
22 actuator
24 outlets
26 conduit arrangement
28 valve
30 inner plates
32 outer plates
34 front part
36 ring-shaped groove
38 ring-shaped piston
40 pressure plate
42 back part
44 male spline of clutch hub
46 female spline of inner plates
48 clutch conduit
50 hub portion of individual clutch conduits
52 front part portion of individual clutch conduits
54 inlet of clutch conduit
56 cylindrical portion
58 spring
60 protrusions of pressure plate
62 through hole of clutch hub
64 through hole of front part
66 through hole of wet clutch
68 through hole of gear assembly
70 circumferential groove of front part
72 inner wall portion of through hole of front part
74 apertures of clutch basket
76 female splines of clutch basket
78 male splines of outer plates
80 gear wheel
82 axially extending flange of gear wheel
84 radial spacer 88 additional internal shaft conduit for hydraulic fluid
90 axis of shaft
92 channels of inner plates
94 through hole of pressure plate
96 valve seat
98 gaskets
100 gap
102 splines of clutch hub
104 first rolling bearing
106 second rolling bearing
108 inner race
110 outer race
112 rolling elements or balls
114 gap between back part and gear wheel
116 first contact area of back part
118 second contact area of gear wheel
120 first contact surface
122 second contact surface
124 plate-like portion of back part
126 cutouts
128 hole
130 cylindrical portion of clutch basket—
132 radial portion of clutch basket
134 outer edge of back part
136 inner edge of radial portion
138 inner portion of back part
140 outer portion of back part
142 support area of back part
144 bearing conduit
146 central through bore of gear wheel
148 cylindrical inner wall

The invention claimed is:

1. A gear assembly for mounting on a shaft, wherein the gear assembly comprises:
    a gear wheel configured to be rotationally supported with respect to the shaft; and
    a multiple-plate wet clutch, comprising:
        a clutch hub configured to be mounted on the shaft;
        a front part configured to be fixed relative to the shaft;
        a back part configured to be fixed relative to the shaft;
        a clutch basket attached to the gear wheel;
        a clutch pack operationally connecting the clutch hub and the clutch basket, wherein the clutch pack is positioned between the front part and the back part; and
        an actuator supported by the front part and configured to engage the clutch pack and to press the clutch pack against the back part;
    wherein the clutch pack has (a) an unengaged state in which the clutch hub and the clutch basket are unlocked, and (b) an engaged state in which the clutch hub and the clutch basket are locked together, wherein the back part is spaced apart from the gear wheel in the unengaged state, and the back part contacts the gear wheel in the engaged state.

2. The gear assembly according to claim 1, wherein, when going from the unengaged state to the engaged state, the back part and the gear wheel engage one another after reaching the engaged state.

3. The gear assembly according to claim 1, wherein the back part is configured to deform and engage the gear wheel when the clutch pack is in the engaged state.

4. The gear assembly according to claim 1, wherein, in the engaged state, the gear wheel generates an axial load along the shaft at a meshing with a cooperating gear wheel, wherein the axial load pushes the gear wheel and the back part into contact.

5. The gear assembly according to claim 1, wherein the back part forms a first contact area facing the gear wheel, and the gear wheel forms a second contact area facing the first contact area, wherein the first contact area engages the second contact area in the engaged state.

6. The gear assembly according to claim 5, wherein the first contact area and the second contact area have a planar geometry at a right angle to the shaft.

7. The gear assembly according to claim 1, wherein the back part comprises a plate-like portion extending radially with respect to the shaft.

8. The gear assembly according to claim 1, wherein the clutch basket has a radial portion and a cylindrical portion, wherein the radial portion is attached to the gear wheel, and wherein the back part and the cylindrical portion are separated in the engaged state.

9. The gear assembly according to claim 1, wherein the back part comprises an inner portion and an outer portion, and wherein the inner portion engages the gear wheel in the engaged state.

10. The gear assembly according to claim 1, wherein the shaft comprises an internal shaft conduit for a lubricant, and wherein the gear assembly further comprises:
    a first rolling bearing rotationally supporting the gear wheel relative to the shaft;
    a second rolling bearing rotationally supporting the gear wheel relative to the shaft; and
    a bearing conduit configured to operationally connect to the internal shaft conduit and to release the lubricant at the first rolling bearing and the second rolling bearing.

11. A shaft assembly, comprising:
    a shaft; and
    a gear assembly mounted on the shaft, the gear assembly comprising:
        a gear wheel configured to be rotationally supported with respect to the shaft; and
        a multiple-plate wet clutch, comprising:
            a clutch hub configured to be mounted on the shaft;
            a front part configured to be fixed relative to the shaft;
            a back part configured to be fixed relative to the shaft;
            a clutch basket attached to the gear wheel;
            a clutch pack operationally connecting the clutch hub and the clutch basket, wherein the clutch pack is positioned between the front part and the back part; and
            an actuator supported by the front part and configured to engage the clutch pack and to press the clutch pack against the back part;
    wherein the clutch pack has (a) an unengaged state in which the clutch hub and the clutch basket are unlocked, and (b) an engaged state in which the clutch hub and the clutch basket are locked together, wherein the back part is spaced apart from the gear wheel in the unengaged state, and the back part contacts the gear wheel in the engaged state.

* * * * *